Feb. 27, 1962   J. P. OLIVER   3,023,393
LIQUID ELECTRICAL CONNECTION FOR ELECTROLYTIC CELLS
Filed Oct. 22, 1958

INVENTOR.
JOHN P. OLIVER
BY John F. Hohmann
ATTORNEY

3,023,393
LIQUID ELECTRICAL CONNECTION FOR ELECTROLYTIC CELLS

John P. Oliver, Berea, Ohio, assignor to Union Carbide Corporation, a corporation of New York
Filed Oct. 22, 1958, Ser. No. 768,911
9 Claims. (Cl. 339—118)

This invention relates to liquid electrical connections and more particularly relates to the use of a low melting conductive material as an electrical connection between a bus-bar and graphite.

Some electrical equipment, for instance electrolytic cells, requires relatively high current input in order to function efficiently. One particular factor attributing to power loss in such cells is the connection between them and the bus-bar supplying the electrical power. The connection of the bus-bar to the carbon or graphite cell cover such as for example of a chlorine cell is conventionally made by the use of bolts or screw threaded connections, however these involve costly machining operations so as to get close tolerances which will afford the least resistance to large current flow. It has been proposed that a liquid electrical connection be used and this suggestion has been followed to a certain extent by the use of mercury connections. Generally, this is done by providing a recess in the carbon or graphite cell cover into which a quantity of mercury is placed. A non-amalgamating metal plate, suitably steel, is provided on the pool of mercury and thus a low-resistance connection is provided. This type of connection, though advantageous in many respects, has certain disadvantages inherent in the use of mercury. It is a well known fact that mercury vapor is toxic and that exposure to it for too long a time can prove fatal. Further, its vapor pressure increases with temperature and since electrolytic cells generally operate at elevated temperatures, the toxicity hazard is increased. Since mercury is a liquid at room temperatures, as well as in the operating range of the cells, a spillage problem is created making the mercury difficult to recover and adding to the toxic vapor hazard. So, while mercury has certain advantages accompanying its use as an electrical connection, its disadvantages are too many and too severe to make it conducive to widespread use in this field.

Various alloys have been tried, as for example Wood's metal and Rose metal, which have low melting points, but all these exhibited a tendency to oxidize and this tendency was encouraged by the elevated temperatures which accompany electrolytic cell operation. Lead and various lead base alloys resist oxidation but the toxicity of the fumes has made the use of such materials impractical.

It is therefore an important object of this invention to provide a liquid electrical connection which will not give off toxic fumes.

It is another object of this invention to provide an oxidation resistant, non-toxic liquid for use as an electrical connection.

It is a further object of this invention to provide a liquid electrical connection that is solid at room temperature, is oxidation resistant and does not give off toxic fumes.

Figure 1:
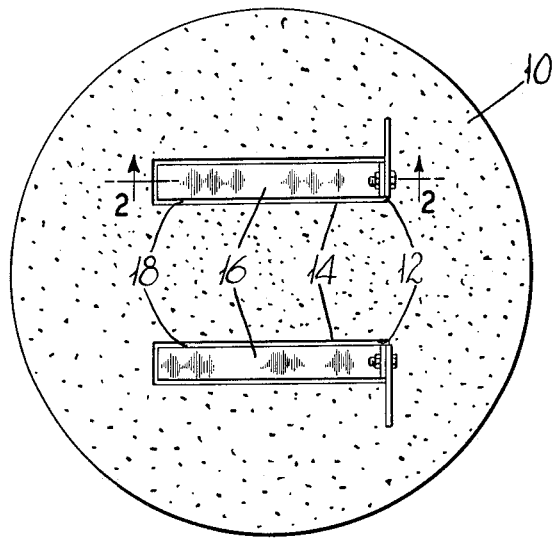
FIG. 1 is a plan view of an electrolytic cell cover having a liquid electrical connection according to this invention.
Figure 2:
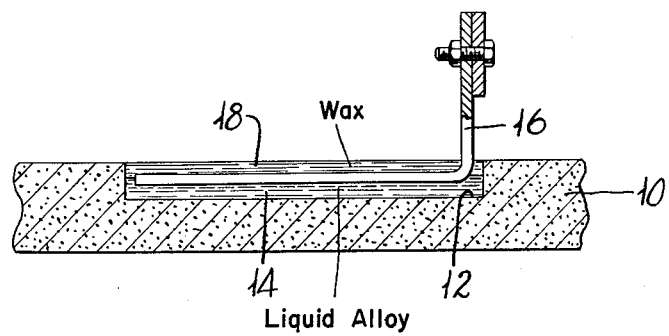
FIG. 2 is a sectioned elevation of an electrolytic cell cover, taken along 2—2 in FIG. 1 looking in the direction of the arrows, having a liquid electrical connection according to this invention.

Broadly, this invention comprises the provision of an oxidation resistant liquid electrical connection between two conductive members. The material used in practicing this invention should be solid at room temperatures, have a low melting point, have non-toxic vapors, and it preferably does not wet the solid conductive members.

It has been found that gallium or indium metal adequately provide the necessary physical properties above mentioned and they may be satisfactorily used in conjunction with this invention. However since the cost of these metals is prohibitive, it is preferred to use certain alloys containing either indium or gallium or both since such alloys exhibit comparable physical properties with a sizable reduction in cost. In general, an alloy to be of use in this invention should have a melting point of between 30° C. and 300° C. and should contain between 5% and 25% in the aggregate of gallium and/or indium. The remaining 75% to 95% of the alloy may comprise one or more of the following: lead, tin, cadmium, bismuth, and aluminum. The proportions of these last five mentioned metals may be varied depending upon the particular melting point and other physical properties desired.

It has been determined that, of the above mentioned compositions, some combinations alloy better and have superior operating characteristics than others. It is therefore preferred to use alloys of the percent compositions listed below in Table I. It is to be noted, in this connection, that other similar alloys having comparable physical properties will suggest themselves to those skilled in the art.

Table I

| Indium | Gallium | Tin | Lead | Cadmium | Bismuth | Aluminum |
|---|---|---|---|---|---|---|
| 100 | 0 | 0 | 0 | 0 | 0 | 0 |
| 0 | 100 | 0 | 0 | 0 | 0 | 0 |
| (¹) | (¹) | 8 | 15 | 0 | 72 | 0 |
| (²) | (²) | 17 | 25 | 10 | 23 | 0 |
| 10.5 | 0 | 12.6 | 22.3 | 5 | 49.6 | 0 |
| 12.5 | 12.5 | (³) | (³) | (³) | (³) | (³) |
| 0 | 25 | (³) | (³) | 0 | 0 | 0 |
| 25 | 0 | (³) | (³) | 0 | 0 | 0 |
| 0 | 25 | 0 | 0 | 0 | 0 | 75 |
| 12.5 | 12.5 | 25 | 50 | 0 | 0 | 0 |
| 12.5 | 12.5 | 50 | 25 | 0 | 0 | 0 |

¹ 5 aggregate.   ² 25 aggregate.   ³ 75 aggregate.

Referring to the accompanying drawings, an electrical connection in accord with the principles of this invention comprises one electrically conductive member 10, which may suitably be a carbon or graphite electrolytic cell cover, having at least one recess 12 therein for receipt of a low-melting point (between 30° C. and 300° C.) electrically conductive material 14 on the bottom thereof. A second conductive member 16 adjacent to and in contact with the low melting point material 14 completes the connection. While the low-melting point material 14 is highly resistant to oxidation, because of the formation of a thin adherent film thereon, it may be further suitably protected against cell product corrosion or oxidation by the use of a high-melting point wax or oil 18 as for example a silicone oil or wax.

Resistance measurements have been taken through electrical connections embodying this invention comprising a 2 inch thick piece of graphite having a ⅟₁₆ inch deep by 2½ inch diameter recess into which was placed a piece of alloy of the following composition: 49.6% bismuth, 22.3% lead, 10.5% indium, 12.6% tin, and the remainder cadmium (composition 5 in Table I). A ⅟₁₆ inch thick by 2½ inch diameter copper disk having a ¼ inch copper riser at its center was placed over the alloy and a current of 200 amperes impressed through the connection. The resistance through the connection at 140° F. was measured to be 0.00009 ohm and by the use of a ½ inch thick copper bus, it was possible to reduce the resistance to 0.00001 ohm.

Additional tests were run on various other types of connections and the average values are compiled below in Table II. Among the different types of connections tested were those employing an interference-fit which comprises a dowel type of rod having a diameter slightly larger than a receiving hole and having notches in the end of the dowel which facilitate forcing this end into the receiving hole thereby forming an extremely tight fit. The helical coil type of connection comprises a spring under compression forcing against the graphite cell cover to be connected. Because of the compression a good electrical contact is made. The liquid alloy which was tested had a composition of 10.5% indium, 12.6% tin, 22.3% lead, 5% cadmium and 49.6% bismuth (composition 5 in Table I).

*Table II*

| Type of connection | Resistance (average) ohms |
|---|---|
| Threaded 3 inch riser (graphite to graphite) | 0.0000862 |
| Threaded 4 inch riser (graphite to graphite) | 0.0000557 |
| Poured lead | 0.000163 |
| Threaded 2 inch brass connector (1 inch deep) | 0.000368 |
| Bolted connection | 0.000124 |
| Helical coil (⅝ inch) | 0.00042 |
| 3 inch round interference-fit | 0.0001473 |
| 4 inch round interference-fit | 0.0000628 |
| 1.1 inch by 7 inch blade interference-fit | 0.000205 |
| 2 inch by 6 inch blade interference-fit | 0.0000891 |
| Liquid alloy ⅟₁₆ inch copper bus | 0.00009 |
| Liquid alloy ½ inch copper bus | 0.00001 |

The tests conducted on connections made in accord with this invention were run at a current density of 40 amperes per square inch, while those conventional connections listed above in Table II were taken at a current density of 20 amperes per square inch since all these connections would not hold up under a 40 ampere per square inch load. This is important since it is to be noted, from the data reported in Table II, that most of the conventional connections had a higher resistance even at the reduced current density than did the connection made according to this invention at the higher current density, and those conventional connections showing comparable resistances were tested at a lower current density since they could not carry the higher load.

What is claimed is:

1. An electrical connection which comprises at least two solid conductive members electrically connected by a molten layer of an alloy comprising 12.6% tin, 22.3% lead, 10.5% indium, 5% cadmium and the remainder bismuth.

2. An electrical connection which comprises a graphite member and a copper member electrically connected by a molten layer of an alloy comprising 12.6% tin, 22.3% lead, 10.5% indium, 5% cadmium and the remainder bismuth.

3. An electrical connection which comprises a graphite member and a copper member electrically connected by an alloy comprising 12.6% tin, 22.3% lead, 10.5% indium, 5% cadmium and the remainder bismuth, said alloy being coated with a high melting point wax around said copper member.

4. In an electrolytic cell operable at about 30° C. to about 300° C.; an electrical connection between a graphite cover of said electrolytic cell and a solid, conductive bus bar which electrical connection has current passing therethrough continuously during the operation of said cell; said electrical connection being an oxidation resistant, non-toxic alloy having a melting point between about 30° C. and 300° C. molten at least during substantially the entire operation of said cell, said alloy comprising between 5 percent and 25 percent by weight in the aggregate of at least one metal selected from the group consisting of indium and gallium and at least 75 weight percent in the aggregate of at least one metal selected from the group consisting of lead, tin, bismuth, cadmium and aluminum.

5. An electrical connection as claimed in claim 4 wherein said alloy comprises about 25 weight percent gallium and about 75 weight percent aluminum.

6. An electrical connection as claimed in claim 4 wherein said alloy comprises 5 to 25 weight percent of a metal selected from the group consisting of induim and gallium, 8 to 17 weight percent tin, 5 to 25 weight percent lead, up to 10 weight percent cadmium, and the remainder bismuth.

7. An electrical connection as claimed in claim 4 wherein said alloy comprises 12.6 weight percent tin, 22.3 weight percent lead, 10.5 weight percent indium, 5 weight percent cadmium, and the remainder bismuth.

8. An electrical connection as claimed in claim 4 wherein said cell cover has at least one recess therein, said alloy residing in said recess in contact with said bus bar.

9. An electrical connection as claimed in claim 4 wherein said alloy is coated with a high melting point wax on substantially all surfaces thereof exposed to the atmosphere.

References Cited in the file of this patent

UNITED STATES PATENTS

| 914,038 | Gugler | Mar. 2, 1909 |
| 1,957,940 | Conradty | May 8, 1934 |
| 2,417,967 | Booe | Mar. 25, 1947 |
| 2,562,150 | Osborne | July 24, 1951 |
| 2,732,464 | Ohl | Jan. 24, 1956 |

OTHER REFERENCES

Ludwick, M. T.: Steel, Nov. 9, 1942, page 81.

Jaffe et al.: Materials and Methods, September 1952, pages 113–115.

Miner and Seastone: Handbook of Engineering Materials (1955), pages 2–407, 408, 410, 411.